(12) United States Patent
Xiong et al.

(10) Patent No.: US 8,483,487 B2
(45) Date of Patent: Jul. 9, 2013

(54) IMAGE PROCESSING DEVICE AND METHOD FOR CAPTURING OBJECT OUTLINE

(75) Inventors: Yu-Kai Xiong, Shenzhen (CN); Xin Lu, Shenzhen (CN); Shih-Fang Wong, New Taipei (TW); Dong-Sheng Lv, Shenzhen (CN); Xin-Hua Li, Shenzhen (CN); Yu-Yong Zhang, Shenzhen (CN); Jian-Jian Zhu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 95 days.

(21) Appl. No.: 13/206,525

(22) Filed: Aug. 10, 2011

(65) Prior Publication Data

US 2013/0004083 A1     Jan. 3, 2013

(51) Int. Cl.
*G06K 9/48*     (2006.01)
(52) U.S. Cl.
USPC ........................................... 382/199

(58) Field of Classification Search
USPC .......................... 382/103, 199, 201, 218, 305
See application file for complete search history.

(56) References Cited

U.S. PATENT DOCUMENTS

| | | | | |
|---|---|---|---|---|
| 6,404,921 B1 * | 6/2002 | Ishida | | 382/197 |
| 7,956,910 B2 * | 6/2011 | Lim et al. | | 348/252 |
| 2008/0303812 A1 * | 12/2008 | Dohta | | 345/419 |

* cited by examiner

*Primary Examiner* — Daniel Mariam
(74) *Attorney, Agent, or Firm* — Altis Law Group, Inc.

(57) ABSTRACT

The disclosure provides a process whereby an image processing device may isolate an outline of an object from an image, and a method adapted for the image processing device. When the image processing device 1 defines a pixel point as a boundary point of an object, the image processing device 1 continues to search for an adjacent boundary point. When the image processing device 1 defines a pixel point as a non-boundary point of the image, the image processing device 1 continues to search for a boundary point from predetermined pixel points until all boundary points have been found unless it is determined that the image does not include an object.

10 Claims, 3 Drawing Sheets

IMAGE PROCESSING DEVICE AND METHOD FOR CAPTURING OBJECT OUTLINE

BACKGROUND

1. Technical Field

The disclosure relates to an image processing device and, more particularly, to an image processing device for capturing an outline of an object from an image and a method of capturing an outline of an object from an image adapted for the image processing device.

2. Description of Related Art

In general, with respect to pixels of an image of an object, a boundary pixel of the object has a sudden change in pixel value as compared to that of the non-boundary pixels. Therefore, in the conventional method of capturing an outline of an object from an image, when the pixel value of one pixel of all the scanned pixels is greater than a reference value, the pixel is regarded as a boundary point of the object, as such, all of the pixels of the image need to be scanned to acquire all boundary points to generate the outline of the object. However, the method of comparing the pixel value of each pixel point of the image with the reference value pixel by pixel is very complex and time-consuming.

Therefore, what is needed is an image processing device for capturing an outline of an object from an image to overcome the described shortcoming

DETAILED DESCRIPTION

Figure 1:
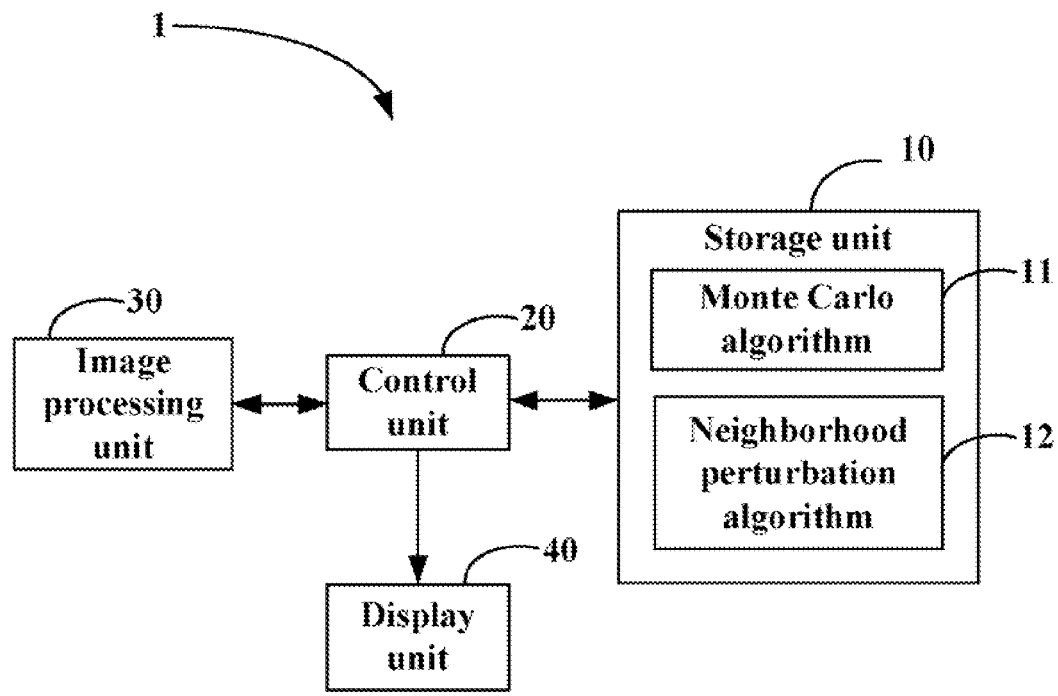
FIG. 1 is a block diagram of an image processing device for capturing an outline of an object from an image, in accordance with an exemplary embodiment.

FIG. 1 is a block diagram of an image processing device 1 for capturing an outline of an object from an image, in accordance with an exemplary embodiment. The image processing device 1 for capturing an outline of an object from an image (hereinafter "the image processing device") includes a storage unit 10, a control unit 20, an image processing unit 30, and a display unit 40. The storage unit 10 stores a Monte Carlo algorithm 11 and a neighborhood perturbation algorithm 12. The control unit 20 controls the image processing device 1. The image processing unit 30 processes an image to obtain a pixel matrix of the image. The display unit 40 displays information.

Figure 2:
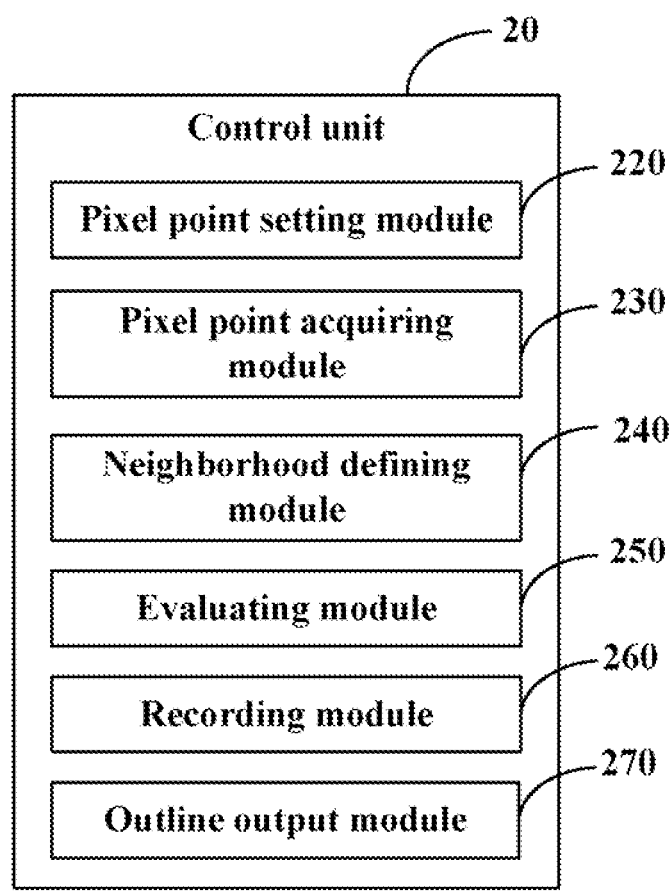
FIG. 2 is a block diagram of a control unit of the image processing device of FIG. 1.

As shown in FIG. 2, the control unit 20 further includes a pixel point setting module 220, a pixel point acquiring module 230, a neighborhood defining module 240, an evaluating module 250, a recording module 260, and an outline output module 270. The pixel point setting module 220 obtains a predetermined number of pixel points from the pixel matrix of the image from the image processing unit 30. In the embodiment, the pixel point setting module 220 obtains the predetermined number of pixel points from the pixel matrix of the image according to the Monte Carlo algorithm 11 stored in the storage unit 10. For example, suppose that a pixel matrix of the image includes one hundred thousand pixel points, then the pixel point setting module 220 obtains one thousand pixel points from the one hundred thousand pixel points according to the Monte Carlo algorithm 11. Furthermore, when the image includes a number of objects, the pixel point setting module 220 first divides the image into a number of parts each of which includes an object, and obtains the predetermined number of pixel points from the pixel matrix of each part of the image according to the Monte Carlo algorithm 11. The method of dividing the image is a conventional technology, so the description of the dividing method is omitted herein.

The pixel point acquiring module 230 acquires one pixel point from the predetermined number of pixel points. In the embodiment, the pixel point acquiring module 230 randomly acquires the particular pixel point from the predetermined number of pixel points. The neighborhood defining module 240 takes the acquired pixel point as the center and defines a neighborhood around the acquired pixel point. In the embodiment, the neighborhood defining module 240 takes the acquired pixel point as the center and defines the neighborhood around the acquired pixel point according to the neighborhood perturbation algorithm 12. For example, the neighborhood defining module 240 defines the neighborhood as a circle around the acquired pixel point according to the neighborhood perturbation algorithm 12.

The evaluating module 250 evaluates whether the difference between the pixel value of the acquired pixel point and the pixel values of any adjacent pixel point within the neighborhood is greater than a preset value. In the embodiment, the preset value is adjustable. For example, suppose that the acquired pixel point has eight adjacent pixel points within the neighborhood, then the evaluating module 250 evaluates whether any difference between the pixel value of the acquired pixel point and the pixel values of each adjacent pixel point within the neighborhood on a one-by-one basis is greater than a preset value. When the difference between the pixel value of the acquired pixel point and the pixel values of any adjacent pixel point within the neighborhood is greater than the preset value, the evaluating module 250 defines that particular pixel point as the boundary point of an object and evaluates whether the boundary point has been recorded in the storage unit 10.

All boundary points of an object are continuous and lie on a particular line, therefore when a boundary point is acquired, one of the adjacent pixel points must be an adjacent boundary point. When the boundary point has not been recorded in the storage unit 10, the recording module 260 records the determined boundary point in the storage unit 10 and the pixel point acquiring module 230 further acquires an adjacent pixel point of boundary point according to a preset rule. For example, the preset rule may be that the point acquiring module 230 acquires the adjacent pixel point which is located first when the point acquiring module 230 searches in a clockwise direction along the boundary point. The neighborhood defining module 240 takes that adjacent pixel point as the center and defines a neighborhood as before.

The evaluating module 250 evaluates whether the difference between the pixel value of that particular adjacent pixel point and the pixel value of any adjacent pixel point within the neighborhood on a one-by-one basis is greater than the preset value. When the difference between the pixel value of the adjacent pixel point and the pixel value of any adjacent pixel point within the neighborhood on a one-by-one basis is greater than the preset value, the evaluating module 250 defines the adjacent pixel point as another boundary point of an object and the recording module 260 records another boundary point in the storage unit 10. The two boundary points are adjacent.

The pixel point setting module 220, the pixel point acquiring module 230, the neighborhood defining module 240, the evaluating module 250, and the recording module 260 work together to repeat the process described above to search for the next boundary point of the object until the recording module 260 has recorded all the boundary points of the object, the outline output module 270 may acquire all recorded boundary points and define an outline of the object composed of the all recorded boundary points. The display unit 40 may display the outline of the object.

When the difference between the pixel value of the acquired pixel point and the pixel value of any adjacent pixel point within the neighborhood on a one-by-one basis is less than the preset value, the evaluating module 250 further defines the pixel point as a non-boundary point. The pixel point acquiring module 230 continues to acquire another pixel point from the predetermined number of pixel points obtained by the pixel point setting module 220 and the evaluating module 250 evaluates whether the another pixel point can be determined as a boundary point of the object. If not one boundary point from the predetermined number of pixel points can be acquired, the evaluating module 250 determines that the image does not include an object.

Therefore, when the image processing device 1 defines a pixel point as a boundary point of an object, the image processing device 1 continues to search for an adjacent boundary point from pixel points adjacent to the determined boundary point. When the image processing device 1 defines a pixel point as a non-boundary point, the image processing device 1 continues to search for a boundary point from the predetermined number of pixel points until a boundary point or complete boundary has been found unless the image is determined as not including an object.

Figure 3:
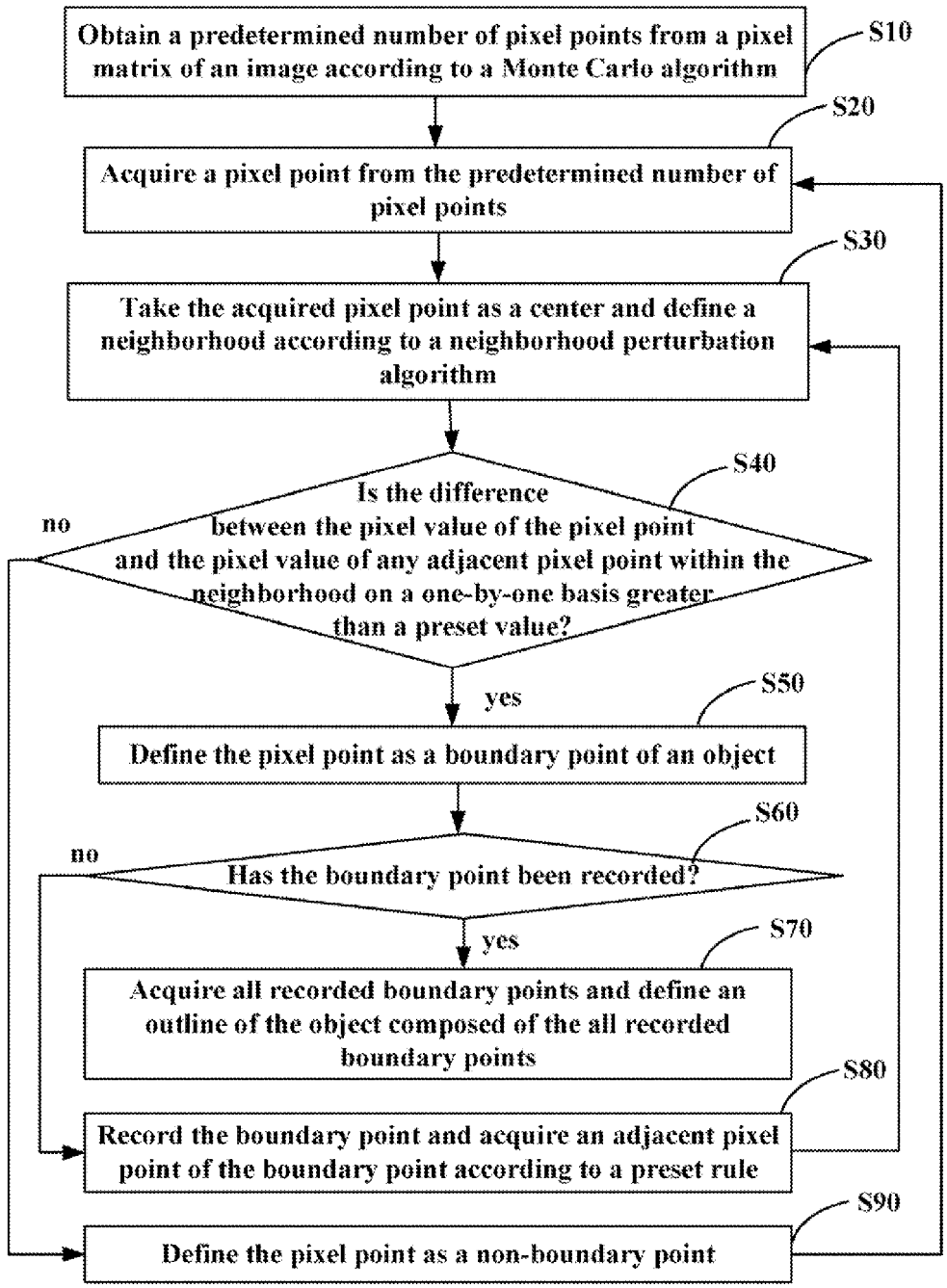
FIG. 3 is a flowchart of a method of capturing an outline of an object from an image adapted for the image processing device of FIG. 1.

FIG. 3 is a flowchart of a method of capturing an outline of an object from an image adapted for the image processing device of FIG. 1. In step S10, the image processing unit 30 processes the image to obtain a pixel matrix of the image and the pixel point setting module 220 obtains the predetermined number of pixel points from the pixel matrix of the image according to the Monte Carlo algorithm 11. In step S20, the pixel point acquiring module 230 acquires the pixel point from the predetermined number of pixel points. In step S30, the neighborhood defining module 240 takes the acquired pixel point as the center and defines a neighborhood according to the neighborhood perturbation algorithm 12.

In step S40, the evaluating module 250 evaluates whether the difference between the pixel value of the acquired pixel point and the pixel values of any adjacent pixel point within the neighborhood on a one-by-one basis is greater than a preset value. If a difference between the pixel value of the acquired pixel point and the pixel value of any adjacent pixel point within the neighborhood on a one-by-one basis is greater than the preset value, in step S50, the evaluating module 250 defines the pixel point as the boundary point of an object. In step S60, the evaluating module 250 further evaluates whether the boundary point has been already recorded in the storage unit 10. If the boundary point has been recorded in the storage unit 10, in step S70, the outline output module 270 acquires all recorded boundary points from the storage unit 10 and defines an outline of the object composed of all the recorded boundary points.

If the difference between the pixel value of the acquired pixel point and the pixel value of any adjacent pixel point within the neighborhood on a one-by-one basis is less than the preset value, in step S90, the evaluating module 250 further defines the pixel point as a non-boundary point of the image, and the procedure goes back to step S20. If a boundary point has not been recorded in the storage unit 10, in step S80, the recording module 260 records the determined boundary point in the storage unit 10 and the pixel point acquiring module 230 further acquires an adjacent pixel point of the boundary point according to the preset rule, and the procedure goes back to step S30.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An image processing device comprising:
   a storage unit;
   an image processing unit for processing an image to obtain a pixel matrix of the image; and
   a control unit, comprising:
      a pixel point setting module for obtaining a predetermined number of pixel points from the pixel matrix of the image from the image processing unit;
      a pixel point acquiring module for acquiring a pixel point from the predetermined number of pixel points;
      a neighborhood defining module for taking the acquired pixel point as a center and defining a neighborhood around the acquired pixel point;
      an evaluating module for evaluating whether the difference between the pixel value of the acquired pixel point and the pixel value of any adjacent pixel point within the neighborhood on a one-by-one basis is greater than a preset value, if the difference between the pixel value of the acquired pixel point and the pixel value of any adjacent pixel point within the neighborhood on a one-by-one basis is greater than the preset value, defining the pixel point as a boundary point of an object from the image, and evaluating whether the boundary point has been recorded in the storage unit and the pixel point acquiring module further for acquiring an adjacent pixel point of the boundary point according to a preset rule to the evaluating module as before;
      a recording module for recording the boundary point in the storage unit if the boundary point has not been recorded in the storage unit; and
      an outline output module for acquiring all recorded boundary points and defining an outline of the object composed of the all recorded boundary points when all boundary points have been recorded in the storage unit.

2. The image processing device as recited in claim 1, the evaluating module further defining the pixel point as a non-boundary point of the image if the difference between the pixel value of the acquired pixel point and the pixel value of any adjacent pixel point within the neighborhood on a one-by-one basis is less than the preset value.

3. The image processing device as recited in claim 1, wherein the preset value is adjustable.

4. The image processing device as recited in claim 1, wherein the storage unit further stores a Monte Carlo algorithm and the pixel point setting module obtains the predetermined number of pixel points from the pixel matrix of the image according to the Monte Carlo algorithm stored in the storage unit.

5. The image processing device as recited in claim 1, wherein the storage unit further stores a neighborhood perturbation algorithm and the neighborhood defining module takes the acquired pixel point as a center and defines the neighborhood according to the neighborhood perturbation algorithm stored in the storage unit.

6. A method of capturing an outline of an object from an image adapted for an image processing device, wherein the image processing device processes an image to obtain a pixel matrix of the image, the method comprising:

obtaining a predetermined number of pixel points from the pixel matrix of the image;

acquiring a pixel point from the predetermined number of pixel points;

taking the acquired pixel point as a center and defining a neighborhood;

evaluating whether the difference between the pixel value of the acquired pixel point and the pixel value of any adjacent pixel point within the neighborhood on a one-by-one basis is greater than a preset value;

if the difference between the pixel value of the acquired pixel point and the pixel value of any adjacent pixel point within the neighborhood on a one-by-one basis is greater than the preset value, defining the pixel point as a boundary point of an object from the image;

evaluating whether the boundary point has been recorded in the image processing device and acquiring an adjacent pixel point of the boundary point according to a preset rule to evaluate as before;

if the boundary point has not been recorded in the image processing device, recording the boundary point in the image processing device; and if all boundary points have been recorded in the image processing device, acquiring all recorded boundary points and defining an outline of the object composed of the all recorded boundary points.

7. The method of capturing an outline of an object from an image as recited in claim 6, further comprising:

if the difference between the pixel value of the acquired pixel point and the pixel value of any adjacent pixel point within the neighborhood on a one-by-one basis is less than the preset value, defining the pixel point as a non-boundary point of the image.

8. The method of capturing an outline of an object from an image as recited in claim 6, wherein the preset value is adjustable.

9. The method of capturing an outline of an object from an image as recited in claim 6, wherein the image processing device stores a Monte Carlo algorithm, the step "obtaining the predetermined number of pixel points from the pixel matrix of the image" is "obtaining the predetermined number of pixel points from the pixel matrix of the image according to the Monte Carlo algorithm".

10. The method of capturing an outline of an object from an image as recited in claim 6, wherein the image processing device stores a neighborhood perturbation algorithm, the step "taking the acquired pixel point as the center and defining a neighborhood" is "taking the acquired pixel point as the center and defining the neighborhood according to the neighborhood perturbation algorithm".

* * * * *